Figure 1:
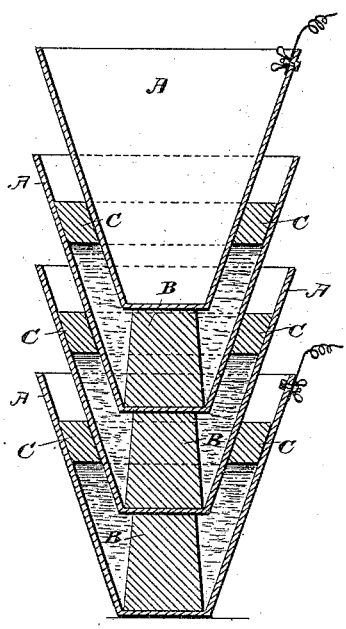

(No Model.) 2 Sheets—Sheet 1.

S. PHILIPPART, FILS.
SECONDARY BATTERY OR ELECTRIC ACCUMULATOR.

No. 311,445. Patented Jan. 27, 1885.

ATTEST.
Geo. T. Smallwood.
J. Henry Kaiser.

INVENTOR.
Simon Philippart fils
By A. Pollok
his atty.

(No Model.) 2 Sheets—Sheet 2.

S. PHILIPPART, FILS.
SECONDARY BATTERY OR ELECTRIC ACCUMULATOR.

No. 311,445. Patented Jan. 27, 1885.

ATTEST—
Geo. T. Smallwood
J. Henry Kaiser

INVENTOR—
Simon Philippart fils
By A. Pollok
his atty.

UNITED STATES PATENT OFFICE.

SIMON PHILIPPART, FILS, OF PARIS, FRANCE, ASSIGNOR TO THE ELECTRICAL POWER STORAGE COMPANY, (LIMITED,) OF LONDON, ENGLAND.

SECONDARY BATTERY OR ELECTRIC ACCUMULATOR.

SPECIFICATION forming part of Letters Patent No. 311,445, dated January 27, 1885.

Application filed April 22, 1884. (No model.) Patented in France March 7, 1881, No. 141,556; in England March 14, 1881, No. 1,097; in Belgium April 15, 1881, No. 54,393; in Germany April 27, 1881, No. 16,318; in Spain June 27, 1881, No. 1,461; in Italy July 16, 1881, No. 13,129, and in Austria-Hungary August 26, 1881, No. 14,285 and No. 28,920.

*To all whom it may concern:*

Be it known that I, SIMON PHILIPPART, Fils, of Paris, in the Republic of France, have invented a new and useful Improvement in Secondary Batteries or Electric Accumulators, (for which I have obtained Letters Patent in France, No. 141,556, dated March 7, 1881; in Belgium, No. 54,393, dated April 15, 1881; in Germany, No. 16,318, dated April 27, 1881; in Great Britain, No. 1,097, dated March 14, 1881; in Italy, No. 13,129, dated July 16, 1881; in Spain, No. 1,461, dated June 27, 1881, and in Austria-Hungary, dated August 26, 1881, Nos. 14,285 and 28,920,) which improvement is fully set forth in the following specification.

In the application of electric accumulators or secondary batteries to industrial uses great difficulty is encountered in respect to the containing-vessels, these being liable to be broken, to become corroded, or otherwise be made leaky and unserviceable.

To overcome these practical difficulties is the main object of the present invention.

To this end the said invention consists in making the electrodes or elements of the couples in the form of cups or vases with solid sides and bottoms, so that they may serve to hold the exciting-liquid, and in nesting together or assembling a series of such cups or vases—one inside the other—so that they constitute a series of cells equal to the number of such cups or vases less one, or, if an electrode of other suitable form be placed in the last cup or vase of the series, equal to the number of cups or vases. The active material of one element of each cell or couple is on the inside of the cup or vase which contains the exciting-liquid of that cell or couple, and the active material of the other element on the outside of the cup or vase, which is placed in the former. The cells or couples are or may be connected in series through the walls of the cups or vases, so that separate connectors and conductors between the cells are dispensed with. The expense and trouble attending their use (including the increased resistance of the battery) are thus avoided. Preferably the cups or vases are of lead prepared for changing or "formed" after the system of Mr. Gaston Planté, or any other system. In this case the solid lead walls serve as the containing-vessel of one cell, the conducting support to the porous active material of one element of that cell, the conducting support to the porous active material of the element of opposite name in the exterior adjacent cell, and the connector between said elements.

The invention also consists in making the electrode cups or vases flaring, or gradually widening toward the top or mouth, and deep, (much deeper than the width or diameter of the bottom.) The object of giving them this shape is to facilitate the circulation of the exciting-liquid in the several cells and the escape from them of the gases which may be generated, and further, to utilize to the fullest extent the surface of the electrodes and prevent the spilling of the exciting-liquid.

The invention further comprises certain special constructions, hereinafter particularly set forth.

Figure 2:
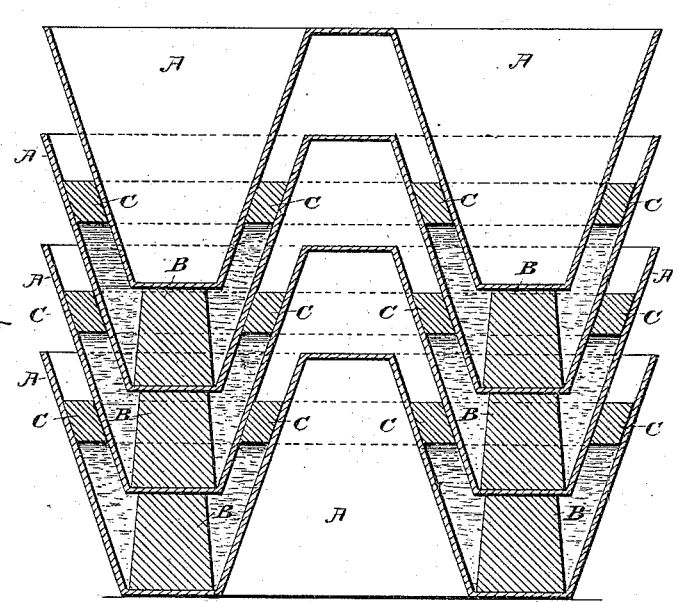
Figure 3:
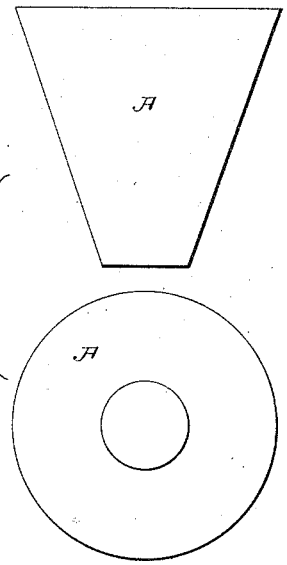

In the accompanying drawings, Figures 1 and 2 are vertical sections of batteries or accumulators constructed in accordance with the invention; and Figs. 3 to 8, views in elevation or section and plan of different forms of the electrode cups or vases. These cups or vases A are frusto-conical in Fig. 1, while in Fig. 2 they are annular with flat bottoms and inclined sides. The shapes of the cups or vases of Figs. 1 and 2, respectively, are shown in elevation and in plan in Figs. 3 and 7, respectively. They are made of lead—as, for example, by casting or stamping. As shown, four of these cups or vases are nested together—one inside the other—and blocks B, of non-conducting material, are placed between the bottoms, so as to leave suitable spaces or cells between the walls of adjacent cups or vases for the exciting-liquid. Blocks or rings C may also be placed between the side walls of the cups or vases to prevent them from tipping over.

When the battery is formed by Planté's method the inside and outside become disintegrated and porous to a greater or less depth, and when charged this porous material, on one side of the cup's wall, is peroxidized, so that it is electro-negative, while that on the other side is reduced to a metallic state, and is electro-positive. The top and bottom cups or vases form the terminals of the series, and to them the conductors of the exterior charging or discharging circuit are connected. Of course, as only the outside of the top cup or vase and the inside of the bottom one are bathed by the exciting-liquid, those surfaces only are active.

Figure 4:
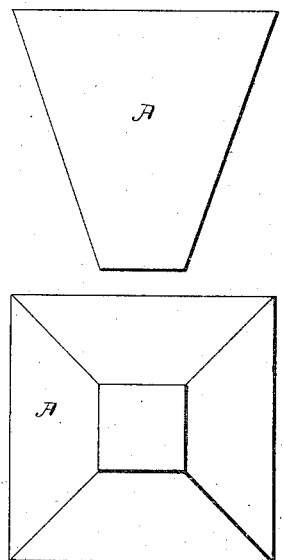
Figure 5:
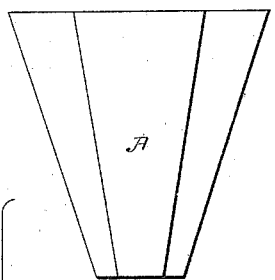
Figure 5:
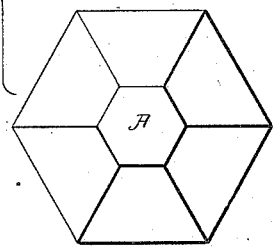
Figure 6:
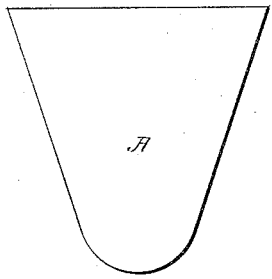
Figure 6:
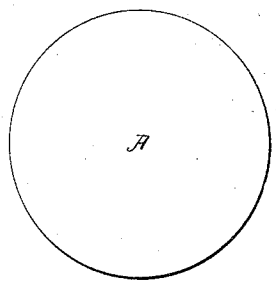
Figure 7:
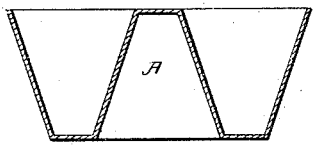
Figure 8:
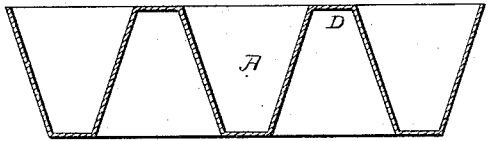
Figure 8:
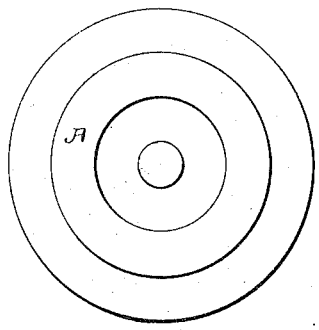
Figure 8:
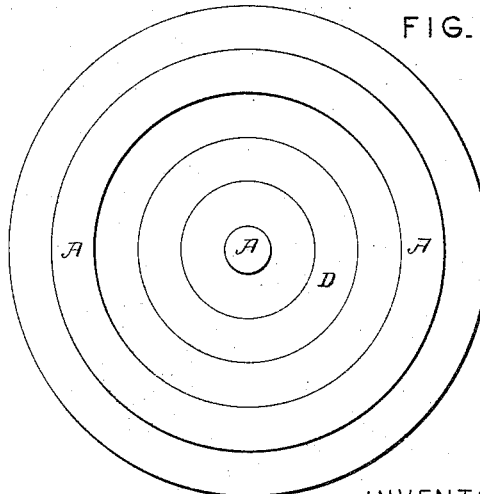

In Fig. 4 the cup or vase is the frustum of a right pyramid of four inclined sides, and in Fig. 5 the frustum of a similar pyramid of six sides. In Fig. 6 the cup or vase is conical, with rounded bottom, while in Fig. 8 the cup or vase is divided by the annular upright wall D, so that each cup or vase forms a double containing-vessel—an annular exterior one similar to that of Figs. 2 and 7, and a conical interior one similar to that of Figs. 1 and 3. In fact, it is substantially as if the battery shown in Fig. 1 were set inside that of Fig. 2, except that the conical inclosed cup or vase and the annular inclosing one of the same level, being made in one piece, would be connected in multiple arc without requiring any separate connector.

In all the figures it will be seen that the electrode cups or vases flare gradually, and have a much greater depth than width at the bottom, so that the cells are deep and narrow. It is obvious, however, that leaden vessels more flaring and less deep could be used, these, even if having or approaching the shape of a saucer, being cups or vases within the meaning of the specification. It is evident, however, that in this case the advantages of the deep and narrow vessels would be lost.

It is obvious that other modifications and changes in detail could be made and the invention still be in whole or in part employed.

The invention does not include any matter described or shown in British Letters Patent No. 2,922 of 1859. The battery set forth therein is a primary and not a secondary battery, is composed of different materials from those constructed in accordance with the present invention, contains no porous active material, certainly none in the sense of this specification, and as the term is now employed in connection with secondary batteries or electric accumulators, and is otherwise differently constructed.

I claim the new improvements described, to wit:

1. A secondary battery comprising a series of cups or vases with porous active material on the inside and porous active material on the outside, said cups or vases being set one within another and separated so as to leave between them spaces or cells for the exciting-liquid, substantially as described.

2. In a secondary battery, a series of lead cups or vases set one within another, and separated so as to form spaces for the exciting-liquid between them, substantially as described.

3. A secondary battery comprising a series of conducting cups or vases made of the same metal inside and outside, said cups or vases being set one within another, and being separated to leave between them spaces or cells for the exciting-liquid, substantially as described.

4. In a secondary battery, a series of cups or vases placed one within another, with pieces of non-conducting material interposed, said pieces separating the cups or vases from one another and forming supports for the same within the inclosing cup or vase below, substantially as described.

5. In a secondary battery comprising a series of cups or vases set one within another, and separated to leave cells or spaces for the exciting-liquid, the gradually-flarings cups or vases separated by strips or pieces within the cups, having a depth much greater than the width of the cups or vases at the bottom, so that the cells between them are deep and narrow, substantially as described.

6. In a secondary battery, a conducting cup or vase divided by an upright wall, so as to constitute a double containing-vessel, substantially as described.

7. A cell of secondary battery comprising a cup or vase provided on its interior upright wall with a porous active layer, combined with an inclosed electrode or element of unlike name, also provided with a layer of porous active material, said cup or vase constituting the containing-vessel of the cell and the conducting-support of the active material on the inner wall of the same, substantially as described.

In testimony whereof I have signed this specification in the presence of two subscribing witnesses.

SIMON PHILIPPART, FILS.

Witnesses:
  H. DELL,
    4 *Great Winchester Street, E. C.*
  CLAUDE WOODROW,
    31 *Lombard Street, E. C.*